(12) United States Patent
Lauterbach et al.

(10) Patent No.: US 9,890,342 B2
(45) Date of Patent: Feb. 13, 2018

(54) ONE-STEP PRODUCTION OF LONG-CHAIN HYDROCARBONS FROM WASTE-BIOMASS-DERIVED CHEMICALS

(71) Applicants: Jochen Lauterbach, Columbia, SC (US); Jason R. Hattrick-Simpers, Irmo, SC (US); Cun Wen, Columbia, SC (US)

(72) Inventors: Jochen Lauterbach, Columbia, SC (US); Jason R. Hattrick-Simpers, Irmo, SC (US); Cun Wen, Columbia, SC (US)

(73) Assignee: University of South Carolina, Columbia, SC (US)

( * ) Notice: Subject to any disclaimer, the term of this patent is extended or adjusted under 35 U.S.C. 154(b) by 516 days.

(21) Appl. No.: 14/580,450

(22) Filed: Dec. 23, 2014

(65) Prior Publication Data

US 2015/0175497 A1  Jun. 25, 2015

Related U.S. Application Data

(60) Provisional application No. 61/920,161, filed on Dec. 23, 2013.

(51) Int. Cl.
| | | |
|---|---|---|
| *C07C 1/20* | (2006.01) | |
| *C10L 1/06* | (2006.01) | |
| *C10L 1/04* | (2006.01) | |
| *C10G 3/00* | (2006.01) | |
| *B01J 29/04* | (2006.01) | |

(52) U.S. Cl.
CPC ............... *C10L 1/06* (2013.01); *C10G 3/47* (2013.01); *C10G 3/49* (2013.01); *C10L 1/04* (2013.01); *B01J 29/043* (2013.01); *C10L 2270/02* (2013.01); *C10L 2290/54* (2013.01); *Y02P 30/20* (2015.11)

(58) Field of Classification Search
CPC . B01J 29/043; C10G 3/47; C10G 3/49; C10L 1/04; C10L 1/06; C10L 2270/02; C10L 2290/54
See application file for complete search history.

(56) References Cited

U.S. PATENT DOCUMENTS

2012/0283493 A1* 11/2012 Olson ..................... C10L 1/08
585/242

* cited by examiner

*Primary Examiner* — Sharon Pregler
(74) *Attorney, Agent, or Firm* — Dority & Manning, PA

(57) ABSTRACT

Methods for deriving a high-C hydrocarbon fuel from an organic source feedstock are provided. The method can include: contacting a mixture of the organic source feedstock and an aldehyde with a catalytic material to produce a product stream comprising a high-C hydrocarbon fuel, and separating the high-C hydrocarbon fuel in the product stream from any remaining organic source feedstock or aldehyde. The catalytic material comprises a metal and a zeolite.

27 Claims, 14 Drawing Sheets

ONE-STEP PRODUCTION OF LONG-CHAIN HYDROCARBONS FROM WASTE-BIOMASS-DERIVED CHEMICALS

PRIORITY INFORMATION

The present application claims priority to U.S. Provisional Patent Application Ser. No. 61/920,161 titled "One-Step Production of Long-Chain Hydrocarbons from Waste-Biomass-Derived Chemicals Using Bi-Functional Heterogeneous Catalysts" of Lauterbach, et al. filed on Dec. 23, 2013, the disclosure of which is incorporated by reference herein.

BACKGROUND

The current energy policies around the world have encouraged the development of renewable, clean and sustainable energy sources in an effort to reduce greenhouse emissions. The conversion of sustainable biomass for the production of energy and high value chemicals has been proposed as an enabling technology and received a great deal of interest for decades. From a technical stand point, chemicals extracted from biomass generate less waste than their oil-based counterparts. Thereby, various processes such as cellulosic plants, algae, triglyceride plants, and rubber plants have been suggested as feedstocks to produce biofuels (diesel, gasoline or ethanol) from biomass.

Liquid petroleum fuels are responsible for more than 93% of all transportation energy consumption in the United States, and volatility in gas prices, reduced reserves and greenhouse gas emissions have led to a rapidly growing interest in biofuels. The conversion of biomass to drop-in transportation fuels offers the benefit of providing a renewable replacement for hydrocarbon fuels currently used in a vital subset of transportation (i.e., heavy transport applications). It has also been proposed to be a method of reducing overall $CO_2$ emissions by closing the carbon cycle. A substantial disadvantage to the use of biomass, however, is the competition with resources for food production, and thus recent research has focused on converting residual bio-waste into transportation fuels.

Unfortunately, biomass stores solar energy in the form of C—H and C—C bonds along with energy-neutral C—O and O—H bonds. To harness the energy contained in biomass, the C—O and O—H bonds should be removed while preserving the C—H and C—C bonds with maximum overall energy efficiency. Three major approaches to the conversion of biomass are currently available: gasification, pyrolysis, and hydrolysis. Gasification involves the complete breakdown of the carbohydrate biomass into CO and $H_2$ by dissociating all the C—C and C—H bonds and most O—H bonds. The C—C and C—H bonds are then reformed via Fischer-Tropsch synthesis, resulting in a loss of 50-60% of the heat content in the biomass. Pyrolysis is a somewhat less energy intensive process, during which C—O and O—H bonds are dissociated. However, some of the C—C and C—H bonds in the biomass are also broken during pyrolysis; this leads to the semi-selective production of liquid fuels and a loss of about 45% loss of the heat from the biomass. By comparison, hydrolysis provides higher energy efficiency due its inherently milder and selective conversion. However, a series of lengthy and complicated reaction steps are typically necessary generate biofuels from biomass, because biomass is mainly composed of cellulose and lignin, both polymerized sugars. First, the cellulose biomass must undergo complete C—O bond dissociation for de-polymerization into glucoses. Then, the glucoses must be further dehydrated or isomerized to a wide spectrum of platform chemicals, among which 2-methylfuran (2MF) and butanal have recently attracted interests.

Recent research by Corma et al. has demonstrated a promising multi-step technique for producing long-chain hydrocarbons from 2-methylfuran (2MF) and butanal with high activity. First, Amberlyst-15 is used as an acid catalyst in a liquid-phase batch reaction to hydroalkylate 2MF with butanal into 1,1-bisylvylalkanes, which are then separated from 2MF, butanal, and water (side product). This intermediate product is then hydrodeoxygenated over Pt in a separate flow reactor to produce long-chain hydrocarbons. The process minimizes unnecessary C—C and C—H bond dissociation, and thus has high energy- and carbon-efficiency. However, the non-continuous combination of a batch reactor with a plug flow reactor reduces the throughput of the approach and makes scale-up challenging. Furthermore, extra energy and time are required for the separation of 1,1-bisylvylalkanes from 2MF and water.

Combining these process steps into a single, continuous reaction procedure would increase not only the energy efficiency, but also the rate of production towards long-chain hydrocarbons.

SUMMARY

Objects and advantages of the invention will be set forth in part in the following description, or may be learned through practice of the invention.

Methods are generally provided for deriving a high-C hydrocarbon fuel from an organic source feedstock. In one embodiment, the method comprises: contacting a mixture of the organic source feedstock and an aldehyde with a catalytic material to produce a product stream comprising a high-C hydrocarbon fuel, and separating the high-C hydrocarbon fuel in the product stream from any remaining organic source feedstock or aldehyde. The catalytic material generally comprises a metal and a zeolite.

Other features and aspects of the present invention are discussed in greater detail below.

BRIEF DESCRIPTION OF THE DRAWINGS

A full and enabling disclosure of the present invention, including the best mode thereof to one skilled in the art, is set forth more particularly in the remainder of the specification, which includes reference to the accompanying figures.

DEFINITIONS

Figure 1:
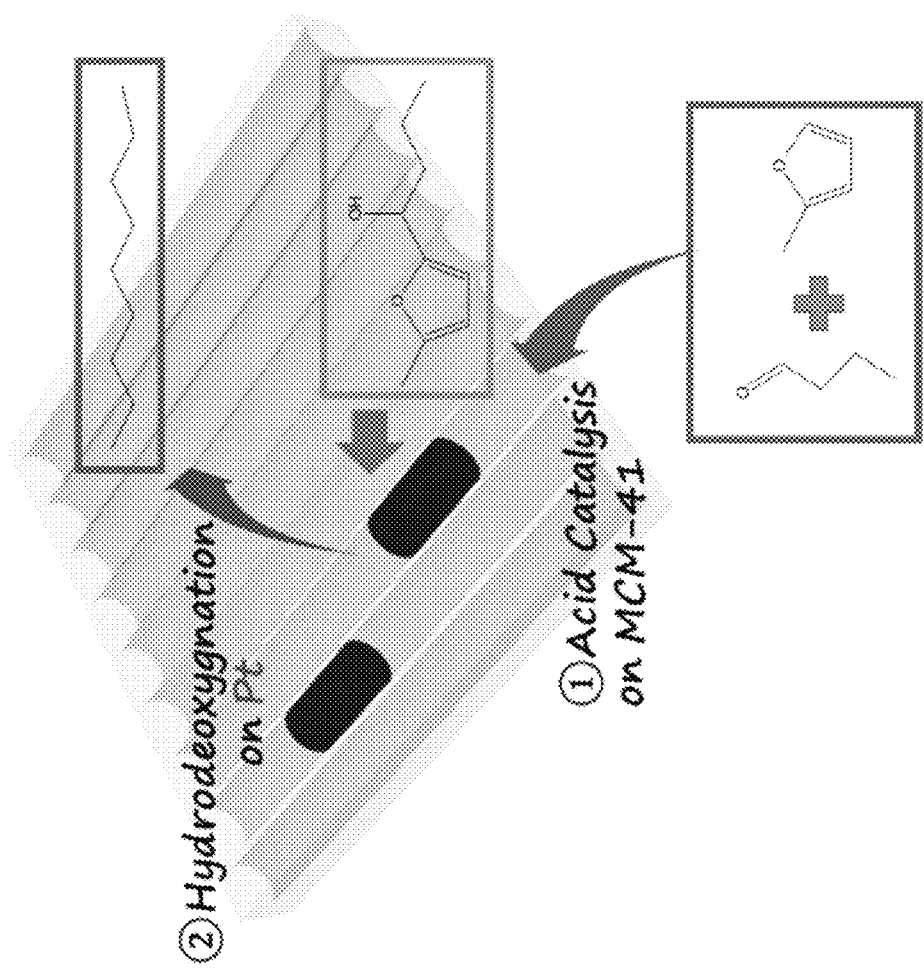
FIG. 1 shows an exemplary scheme of $C_{8+}$ production bi-functional Pt/MCM-41 catalyst.

Chemical elements are discussed in the present disclosure using their common chemical abbreviation, such as commonly found on a periodic table of elements. For example, hydrogen is represented by its common chemical abbreviation H; helium is represented by its common chemical abbreviation He; and so forth.

As used herein, the term "high-C hydrocarbon fuel" refers to a mixture of hydrocarbons having carbon chains that contain 8 or more carbon atoms per molecule (e.g., 8 to 17 carbon atoms per molecule). For example, "high-C hydrocarbon fuel" can refer to aviation fuel or jet fuel (e.g., JP-8).

Alternatively, the term "low-C hydrocarbon fuel" refers to a mixture of hydrocarbons having carbon chains that contain 2 to 4 carbon atoms per molecule, such as 2 to 4 carbon atoms per molecule, including but not limited to alkanes (e.g., ethane, propane, butane), alkenes (e.g., ethylene, propylene, butylene), etc. For example, "low-C hydrocarbon fuel" can refer to liquefied petroleum gas, which is mixture primarily of propane and butane, but may also contain small amounts of propylene and/or butylene as well as other low-C hydrocarbons.

The term "organic" is used herein to refer to a class of chemical compounds that are comprised of carbon atoms. For example, an "organic polymer" is a polymer that includes carbon atoms in the polymer backbone, but may also include other atoms either in the polymer backbone and/or in side chains extending from the polymer backbone (e.g., oxygen, nitrogen, sulfur, etc.).

As used herein, the term "substantially free" means no more than an insignificant trace amount present and encompasses completely free (e.g., 0 molar % up to 0.01 molar %).

It is to be understood that the ranges and limits mentioned herein include all ranges located within the prescribed limits (i.e., subranges). For instance, a range from about 100 to about 200 also includes ranges from 110 to 150, 170 to 190, 153 to 162, and 145.3 to 149.6. Further, a limit of up to about 7 also includes a limit of up to about 5, up to 3, and up to about 4.5, as well as ranges within the limit, such as from about 1 to about 5, and from about 3.2 to about 6.5.

DETAILED DESCRIPTION

Reference now will be made to the embodiments of the invention, one or more examples of which are set forth below. Each example is provided by way of an explanation of the invention, not as a limitation of the invention. In fact, it will be apparent to those skilled in the art that various modifications and variations can be made in the invention without departing from the scope or spirit of the invention. For instance, features illustrated or described as one embodiment can be used on another embodiment to yield still a further embodiment. Thus, it is intended that the present invention cover such modifications and variations as come within the scope of the appended claims and their equivalents. It is to be understood by one of ordinary skill in the art that the present discussion is a description of exemplary embodiments only, and is not intended as limiting the broader aspects of the present invention, which broader aspects are embodied exemplary constructions.

Bi-functional catalysts (Pt/MCM-41) for producing long-chain hydrocarbons ($C_{8+}$) by combining solid acid and hydrodeoxygenation (HDO) functionalities, along with the reaction methods, are generally provided, such as shown in FIG. 1. For the catalytic upgrading of biomass and biomass derived chemicals to liquid hydrocarbon transportation fuels, acid catalysis and hydrodeoxenation are two major steps. These operations need to be performed with maximum carbon and energy efficiency to be economically and environmentally viable. Herein, it is provided a novel class of catalysts for a one-step heterogeneous reaction performed in plug flow mode, which does not require any intermediate distillation and can be scaled up easily.

I. Organic Source Feedstock

The organic source feedstock for the conversion reaction includes $C_5$ to $C_6$ oxygen-containing organic compounds. The organic source feedstock for the conversion reaction includes, in one embodiment, at least 50%, by weight, of $C_5$ to $C_6$ oxygen-containing organic compounds, such as at least 75% by weight.

In one embodiment, the organic source feedstock is a mixture of aliphatic and/or aromatic organic compounds recovered from a natural source or biomass. For example, the organic source feedstock can be obtained from lignocellulose and starch based plants, triglyceride plants (e.g., vegetable oil), algae, terpenes and rubber plants, etc. The organic source feedstock can be, in one embodiment, generally free from aromatic organic compounds. That is, the organic source feedstock is, in certain embodiments, at least about 95% by weight aliphatic organic compounds with less than about 5% by weight aromatic compounds present. In one embodiment, the organic source feedstock is at least about 99% by weight aliphatic organic compounds with less than about 1% by weight aromatic compounds present. For example, the organic source feedstock can be, in one particular embodiment, substantially free from aromatic organic compounds. Alternatively, the organic source feedstock can include aromatic compounds.

When obtained from a biomass feedstock, the organic source feedstock can include furfurals (e.g., 2-furaldehyde, 5-hydroxymethylfurfural, etc.), furfural derivatives (e.g., furfuryl alcohol, methylfuran, tetrahydrofurfuryl alcohol, hydroxylmethylfurfural (HMF), 2-methlyhydrofuran, 2-methyltetrahydrofuran, tetrahydrofuran-5-dimethanol, furoic acid, 1,5-pentanediol (PDL), 1,2-pentanediol, 1,4-pentanediol, etc.), levulinic acid, derivatives of levulinic acid (e.g., angelica lactone, levulinic acid esters, γ-valerolactone (GVL), methyltetrahydrofuran (MTHF), 1,4-butanediol, succinic acid, formic acid, 1-pentanol, and 2-pentanol), etc., or mixtures thereof.

Furfural is a useful product made by the dehydration of pentoses, which are in high concentrations in lignocellulosic and hemicellulosic biowastes. Furfural, which is produced at nearly 300 million kg/yr, is used as a solvent and a so-called platform chemical precursor to other useful chemicals such as tetrahydrofuran, furfural alcohol, and PDL. PDL is a specialty chemical that can be derived from the furfural platform chemical in high yields. PDL is used as an additive in synthetic materials or as an intermediate for agrochemical and pharmaceutical products. Industrial suppliers of PDL are located throughout the world. Levulinic acid (LVA) is another common platform chemical produced from biowaste. The Department of Energy identified LVA as a top value added chemical due to its versatility as a precursor to many industrially relevant chemicals.

In particular embodiments, the organic source feedstock includes 2-methylfuran, butanal, angelica lactone, any derivatives thereof, or mixtures thereof. This feedstock can be produced on a large scale from waste biomass, such as corn and sunflower husks. For example, the organic source feedstock can include, in one embodiment, 2-methylfuran (2-MF) or its derivatives. Additionally or alternatively, the organic source feedstock can include butanal or its derivatives and/or angelica lactone or its derivatives and/or mixtures thereof.

II. Catalytic Material

The catalytic material for conversion of the deriving a high-C hydrocarbon fuel from an organic source feedstock is generally a bi-functional catalyst formed by a combination of a metal and a solid acid. In certain embodiments, the metal can be deposited on a solid acid support to form a catalytic surface.

Solid acid materials are high surface area supports that have a high activity for many reforming reactions. In one particular embodiment, the solid acid material can be a mixture of alumina and silica having a Si/Al ratio selected to control the total acidity as well as acid site strength, pore size, activity and stability. Such solid acids can be prepared by mixing sodium aluminate and sodium silicate, followed by controlled crystallization, usually in the presence of a structure-directing template. Syntheses often must be prepared in hydrothermal conditions at elevated pressure. They can also be easily cation exchanged. Variation of the alumina and silica contents can alter the properties of these materials and tailor their activity for different reactions. Specifically, activity and stability of the catalysts are affected by the silica-to-alumina molar ratio present in the structure. In particular embodiments, the silica to alumina molar ratio can be from about 5 to about 200, such as about 20 to about 200.

In particular embodiments, the solid acid may be present in the form of a zeolite support (e.g., particles, flakes, sheets, etc.). For example, the zeolite support may be in the form of a nanoporous materials. For instance, mesoporous silica nanoparticles may be utilized as the zeolite support in certain embodiments. Mesoporous silicates, such as MCM-41 (Mobil Composition of Matter No. 41, available from Sigma Aldrich), MCM-48 (Mobil Composition of Matter No. 48, available from ACS Materials), mesoporous ZSM-5, FCM-16, SBA-15 (available from ACS Materials), etc., or mixtures thereof, are porous silicates with relatively large surface areas (e.g., about 500 $m^2/g$ or more), large pore sizes (e.g., about 2 nm to about 20 nm) and ordered arrays of cylindrical mesopores with very regular pore morphology. The large surface areas of these solids increase the probability that a reactant molecule will come into contact with the catalyst surface and react. The large pore size and ordered pore morphology allow one to be sure that the reactant molecules are small enough to diffuse into the pores. In one particular embodiment, the zeolite is a mesostructured aluminosilicate.

The catalytic material also includes a relatively small amount of a transition metal or a combination of transition metals. For example, the metal atoms can be incorporated into and/or onto the zeolite support. For instance, metal atoms doped in this way can include cerium (Ce), copper (Cu), europium (Eu), iron (Fe), gallium (Ga), gadolinium (Gd), indium (In), iridium (Ir), lanthanum (La), neodymium (Nd), nickel (Ni), palladium (Pd), praseodymium (Pr), platinum (Pt), rhodium (Rh), ruthenium (Ru), samarium (Sm), zinc (Zn), zirconium (Zr), or mixtures thereof. The metal can be incorporated into/onto the zeolite framework in a weight percent of about 0.01% to about 10% of the total weight of the catalytic material (e.g., the weight of the solid acid(s) and the transition metal(s)), such as about 0.05% to about 5%. For instance, in particular embodiments the precious metal(s) can be included in the catalytic material in a weight percent of about 0.1% to about 2.5% of the total weight of the catalytic material.

These bi-functional heterogeneous catalysts have shown sustained performance for 2-MF upgrading above 90% conversion with a selectivity to $C_{9+}$ above 70%.

III. Conversion of Organic Source Feedstock to High-C Hydrocarbon Fuel

Figure 9:
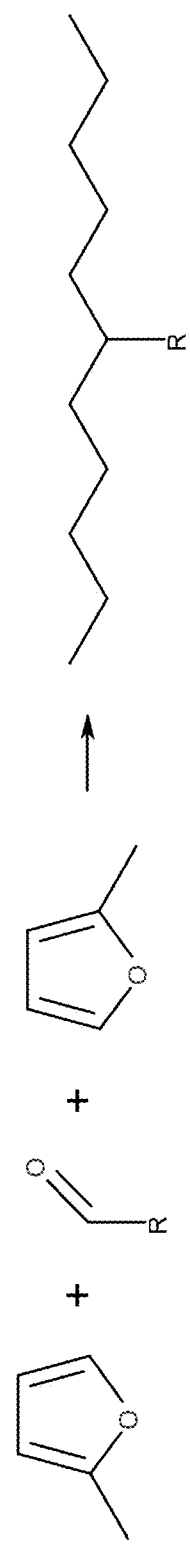
FIG. 9 shows an exemplary reaction schematic utilizing the catalyst described above for a single pot conversion of 2-methylfuran to a high-C hydrocarbon fuel.

In addition to the organic source feedstock and catalytic material, an aldehyde is present in the reaction conversion. FIG. 9 shows an exemplary reaction schematic utilizing the catalyst described above for a single pot conversion of 2-methylfuran to a high-C hydrocarbon fuel. As shown, 2-methylfuran is reacted with an aldehyde to form 6-alkyl undecane.

The aldehyde can be any suitable molecule having an aldehyde functional group (i.e., —CHO). That is, the aldehyde functional group (i.e., —CHO, as shown in the exemplary embodiment of FIG. 9) can be attached to any suitable R group, such as an alkyl chain (e.g., methyl, ethyl, propyl, butyl, alkylbutyl (e.g., methylbutyl), etc.), an alkyne chain, an aromatic group, etc. For example, particularly suitable aldehydes can include, but are not limited to, formaldehyde (a.k.a., methanal), acetaldehyde (a.k.a., ethanal), propionaldehyde (a.k.a., propanal), butraldehyde (a.k.a., butanal), derivatives of butanal (e.g., 2-methylbutanal), benzaldehyde, benzaldehyde derivatives (e.g., vanillin), cinnamaldehyde, tolualdehyde, furfural, retinaldehyde, carbohydrates (e.g., glucose), etc., or derivatives thereof.

In particular embodiments of the present invention, the organic source feedstock and the aldehyde(s) is evaporated and passed over or through the catalyst material (as a solid) at a reaction temperature of between about 190° C. to about 350° C. At these temperatures, the compounds of the organic source feedstock (i.e., the $C_5$ to $C_6$ molecules) and the aldehyde(s) compounds are in a gaseous state, while the catalyst remains a solid.

After the organic source feedstock and the aldehyde are contacted with the catalytic material, the product streamed formed can be passed to a condenser. As such, the product stream from the reactor can be cooled down, such as to a condensation temperature (e.g., about −10° C. to about 20° C.), so as to liquefy any high-C hydrocarbons while leaving any low-C hydrocarbon fuel, any remaining organic source feedstock compounds, and/or any unreacted aldehyde compounds in the gas state. Thus, the desired product (i.e., the high-C hydrocarbon fuel) can be separated as the desired product. Both the unreacted organic source feedstock chemicals and aldehyde compounds can be continuously recycled back to the reactor for further reaction.

In certain embodiments, the yield of the high-C hydrocarbon fuel formed from the organic source feedstock can be about 50 wt % or more, calculated on a mass basis (i.e., kg of high-C hydrocarbons out per kg of organic source feedstock in), which may be increased further with the optimization of reaction conditions. For example, the yield of the high-C hydrocarbon fuel formed from the organic source feedstock can be about 75 wt % or more, such as about 90% or more.

In one particular embodiment, the platform chemical mixture can be introduced into a reactor, along with the catalyst material (e.g., the zeolite and metal) and heated to a reaction temperature of between about 190° C. and about 350° C., such as about 200° C. to about 300° C. There, the reaction can proceed in a continuous manner with inflow of organic source feedstock and aldehyde compounds to produce an outflow of a product stream containing the high-C hydrocarbon fuel. The reaction can, in one embodiment, occur at alleviated pressure (e.g., about 500 psi) and can reach steady state in a short amount of time (e.g., less than about 15 minutes).

As stated, the high-C hydrocarbon fuel can then be separated from any remaining organic source feedstock and/or aldehyde compounds in the product stream. For example, the high-C hydrocarbon fuel can be separated from any remaining organic source feedstock and aldehyde chemicals using a condensation process. In one embodiment of a condensation process, the product stream (i.e., the high-C hydrocarbon fuel) from the reactor is cooled to a condensation temperature where the high-C hydrocarbon liquefies. For example, the condensation temperature can be about −10° C. to about 20° C., such as 0° C. to about 10° C. (e.g., less than about 8° C.).

Any suitable reaction/condensation system can be utilized to perform this method, such as the system discussed in U.S. Provisional Patent Application Ser. No. 61/881,514 of Lauterbach, et al. titled "Flexible Fuel Converter for Producing Liquefied Petroleum Gas from Transportation Fuels" filed on Sep. 24, 2013, which is incorporated by reference herein.

EXAMPLES

In this study, the production of long-chain hydrocarbons ($C_{8+}$) from 2-methylfuran (2MF) and butanal in a single step reactive process by utilizing a bi-functional catalyst with both acid and metallic sites was demonstrated. This approach utilizes a solid acid for the hydroalkylation function and as a support as well as a transition metal as hydrodeoxygenation catalyst. A series of solid acids was screened, among which MCM -41 demonstrated the best combination of activity and stability. Platinum nanoparticles were then incorporated into the MCM-41. The Pt/MCM-41 catalyst showed 96% yield for $C_{8+}$ hydrocarbons and the catalytic performance was stable over four reaction cycles of 20 hour each. The reaction pathways for the production of long-chain hydrocarbons were probed with a combination of infrared spectroscopy and steady-state reaction experiments. It is proposed that 2MF and butanal go through hydroalkylation first on the acid site followed by hydrodeoxygenation to produce the hydrocarbon fuels.

EXPERIMENTAL 2-methylfuran (2MF) (98%), butanal (98%), MCM-41 mesostructured aluminosilicate, ammonium tetrachloroplatinate (II) (99%), methanol (99.8%), Amberlyst-15 (hydrogen form), and Nickel (II) nitrate hexahydrate (97%) were purchased from Sigma-Aldrich, and used as-received. ZSM-5 (Si/Al ratio of 80) was purchased from Alfa Aesar, and was also used as received. Ultra high purity hydrogen (99.999%) was purchased from Airgas.

Catalyst Synthesis:

The 0.1 wt. % Pt/MCM-41 catalyst used in this work was prepared by incipient wetness impregnation of MCM-41 with a methanol solution of ammonium tetrachloroplatinate. The MCM-41 was mixed with the platinum solution under constant stirring at room temperature and the methanol naturally evaporated overnight. The mixture was then dried in an oven at 373 K for 10 h, and calcined at 823K for 3 h with temperature ramping from room temperature to 823K at the rate of 5K/min.

Catalyst Characterizations:

X-ray powder diffraction (XRD) patterns of the MCM-41 and Pt/MCM-41 were obtained with a Rigaku Miniflex II X-ray powder diffractometer equipped with a Cu Kα X-ray source. The specific surface area of the catalyst and nitrogen adsorption and desorption isotherms were measured with a Micromeritics ASAP 2020 surface area and porosimetry analyzer. Before each test, the samples were degassed at 383 K for 3 h under vacuum. Pore size distributions were calculated using the Barret-Joyner-Hollenda (BJH) method based on the nitrogen adsorption data. The morphology of the samples was characterized with a Hitachi H800 transmission electron microscope (TEM), with an acceleration voltage of 200 kV. The nanoparticles were dispersed in acetone onto carbon film copper TEM grids. The X-ray photoelectron spectroscopy (XPS) spectra were measured on Kratos AXIS Ultra DLD XPS system equipped with a monochromatic Al kα (1486.6 eV) as X-ray source operated at 15 keV and 120 W. The pass energy was fixed at 40 eV for the detailed scans. The binding energy in the XPS spectra is calibrated with carbon signal (C1s at 284.8 eV).

Catalytic Activity and Stability Tests:

Catalytic screening was performed in two distinct sets of experiments. The first set used a standard batch reactor set-up to screen for solid materials that would make effective HA catalysts, and involved a broad sampling of potential solid-acid catalysts. The reactions were performed at moderate temperatures to set a baseline for HA activity. A 15 mL mixture of 2-MF and butanal (mole ratio of 2MF:butanal is 2:1) was added to 0.22 g of catalyst. Then, the mixture was heated to 333 K and magnetically stirred for 20 h. After the reaction, the liquid product was filtered out and analyzed with a gas chromatography-mass spectrometer (GC-MS). In the GC-MS, the liquid products are vaporized at 523K and separated with RTX-5 column. After going through the GC column, the products are detected by both flame ionization detector (FID) and quadruple mass spectrometer (Finnigan TSQ MS).

The second set of reactions was performed in a plug-flow reactor to validate the generation of $C_{8+}$ on the bi-functional catalysts. The effect reaction temperature on the $C_{8+}$ production was further explored over a larger temperature window, and the long-term stability of the bi-functional catalysts was tested by running $C_{8+}$ production on the same bi-functional catalyst for multiple times without catalyst regeneration. A stainless-steel fixed bed reactor with outer diameter of 12.7 mm and inner diameter of 9.5 mm was used. The catalyst (4.8 g) was loaded in powder form without pelletizing, and was supported by a quartz wool plug in the reactor. Before reaction, the catalyst was activated under hydrogen flow of 60 mL min-1 at 673 K and 3.5 MPa for 1 h. The reactor pressure was controlled by a backpressure valve (GO Regulator, BP-60), and measured with a pressure gauge. After the activation, the system was cooled down to the desired reaction temperature (between 503-623K), and a mixture of 2MF and butanal (molar ratio of 2MF:butanal of 1:1 with total weight of 19 g) was pumped into the system by a high performance liquid chromatography (HPLC) pump with a flow rate of 0.02 mL/min, under the same hydrogen flow rate and pressure as in the activation step. The mixing of the hydrogen gas and liquid mixture was done just prior to entering the reactor. The reaction was run continuously for 20 h and the products were collected during that period in a liquid-gas separator (kept at 277 K) after the reactor. Typically, more than 85% of the injected 2MF and butanal were converted to liquid phase products. Approximately 17 g of liquid phase was obtained after the reaction with about 20% being aqueous and the balance present as organics. The organic phase was analyzed using GC-MS.

In Situ Diffuse Reflectance Infrared Fourier Transform (DRIFT) Spectroscopy

The in situ DRIFT spectra were acquired on a Bruker Equinox 55 spectrometer coupled with a DRIFT cell (Harrick Scientific Praying Mantis) and a DTGS detector. A 0.1 wt % Pt/MCM-41 sample was first degassed at 573K for 2 h under 50 mL/min He flow and atmospheric pressure. The cell was then cooled down to 333K under flowing He. A background with a spectral resolution of 4 $cm^{-1}$ was collected after the temperature had stabilized by averaging over 640 scans. Then, the reaction mixture of 2-MF and butanal (mole ratio of 2MF:butanal is 1:1) was introduced into the DRIFT cell by a HPLC pump at the rate of 0.01 mL/min. The DRIFT spectra were obtained using the same collection parameters as the background.

Results and Discussion:

Various solid acids were first tested in the batch reactor for the 2MF and butanal alkylation to produce 1,1-bisylvylbutane, and the catalytic activities were compared based on the conversion of 2MF. ZSM-5 zeolite was chosen based on its well-known acid catalysis properties, including alkylation. However, ZSM-5 shows poor activity for the alkylation between 2MF and butanal, with only 1±1% of 2MF converted after 20 h of reaction. The low activity of ZMS-5 may be attributed to the 10 member rings with the zeolite pore size in the range of 5.4-5.6 Å being too small to permit 2MF access to the acid sites. The molecular size of 2MF is estimated to be between 4.8-7.3 Å, based on literature reports. An attempt was made to increase the accessible surface area by synthesizing mesoporous ZSM-5 following literature. This, however, resulted in only a slight increase in the catalytic activity for 2MF and butanal alkylation from 1% to 4%.

In the case of solid acid catalysts with more accessible acid sites (MCM-41, sulfated zirconia, and Amberlyst-15), substantially higher activity (above 60%) toward 2MF conversion was observed, with Amberlyst-15 showing the highest conversion of the group. Sulfated zirconia, however, was not chosen for further study because the sulfate group on the sulfated zirconia may deactivate HDO-active metals, such as Pt, and may lead to sulfur contamination of the final products. Likewise, Amberlyst-15 was not selected for further study as it is a styrene-based resin, and is only stable up to temperatures of ~423 K, which is on the low end of the temperature range required for HDO (473-673 K). MCM-41, on the other hand, was reported to have excellent thermal stability and is unlikely to poison the metal HDO catalysts. Further, compared to ZSM-5, the aluminosilicate MCM-41 exhibits much larger pores (2.6±0.3 nm), more accessible surface area (650±5 $m^2/g$), and also higher activity (62±5% 2MF conversion) for the acid catalyzed 2MF and butanal alkylation. Therefore, MCM-41 was chosen to serve as the acid catalyst for further studies and as the support of the HDO functionality for the bi-functional catalysts.

Figure 2:
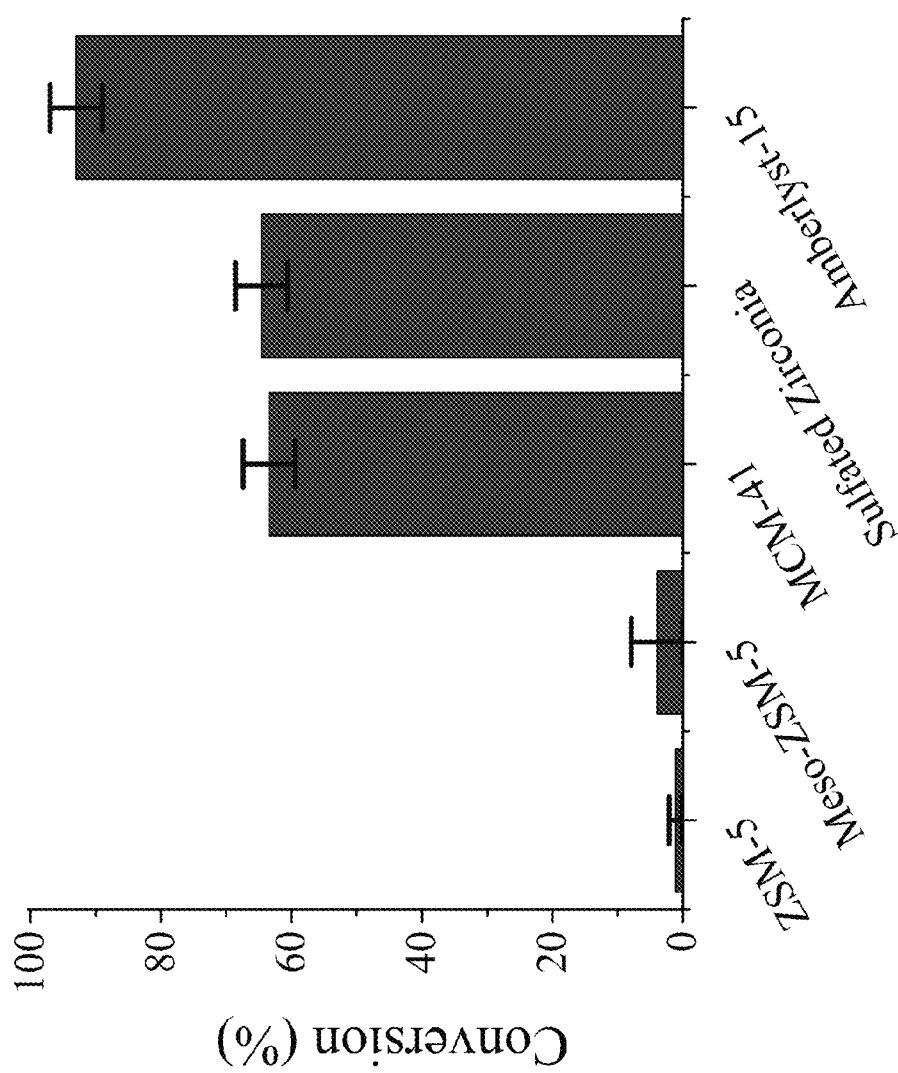
FIG. 2 shows conversion percentage of 2-methylfuran on different solid acids catalyst for 20 h in the alkylation reactions between 2-methylfuran and butanal.

On the MCM-41, Pt is introduced by conventional wet impregnation methods as the HDO function entity for the bi-functional catalysts, as Pt has been used for many HDO processes. As shown in the bright field TEM images in FIG. 2a, the Pt nanoparticles appear darker due to the higher electron density of Pt than that of silica and alumina in the wall of MCM-41, which are the gray stripes apparent in the FIG. 3a. The Pt nanoparticles grow within the boundary of the MCM-41 pores, and the growth direction of Pt nanoparticles aligns with the pore channels of MCM-41. Thus, based on the TEM images, the Pt nanoparticles are believed to be located inside the pores of the MCM-41 instead of on the outer surface of the MCM-41. As Pt and MCM-41 are the two functional entities for the bi-functional catalyst, having the Pt nanoparticles distributed inside the pores of the MCM-41 could facilitate the $C_{8+}$ production by decreasing the spatial separation between the two reaction steps, as shown in exemplary scheme of FIG. 1.

To be active for HDO, the Pt should be in the metallic form. The oxidation state of the Pt after reduction under $H_2$ at 400° C. was characterized with X-ray photoelectron spectroscopy (XPS). As seen from the Pt 4f XPS profile, the binding energy of Pt 4f 5/2 (70.6 eV) is consistent with that of metallic Pt. Thus, both TEM and XPS results demonstrate that Pt is not only introduced on the MCM-41, but is also present in the metallic phase needed for the HDO reaction.

Figure 3A:
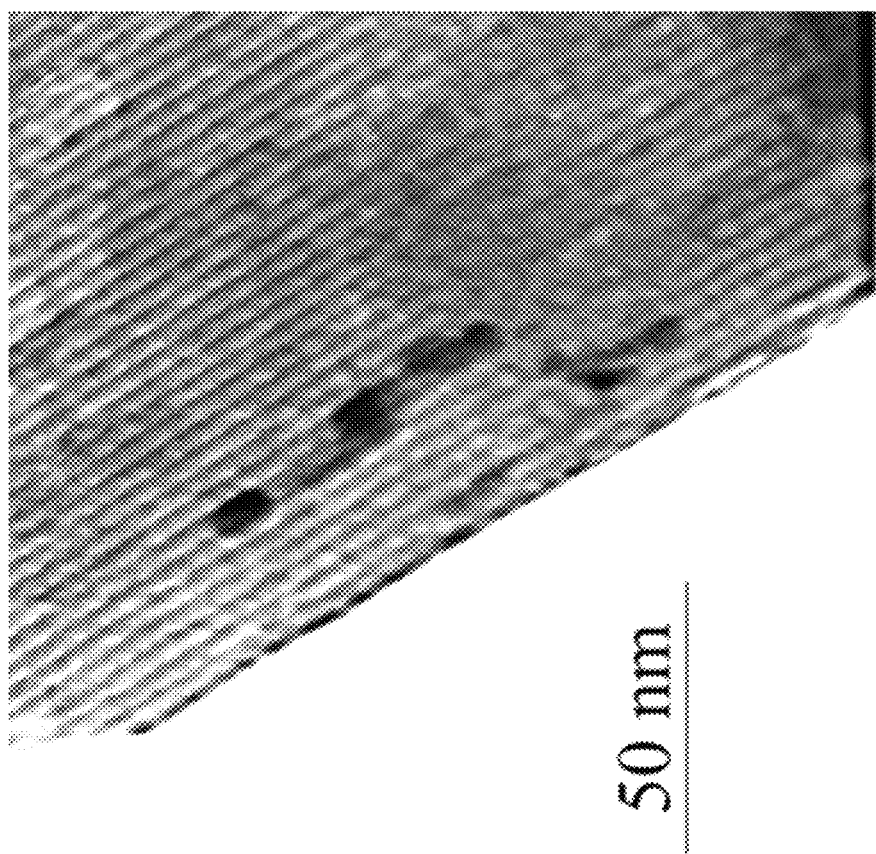
FIG. 3a shows a bright field TEM image of Pt/MCM-41 formed according to the Examples.
Figure 3B:
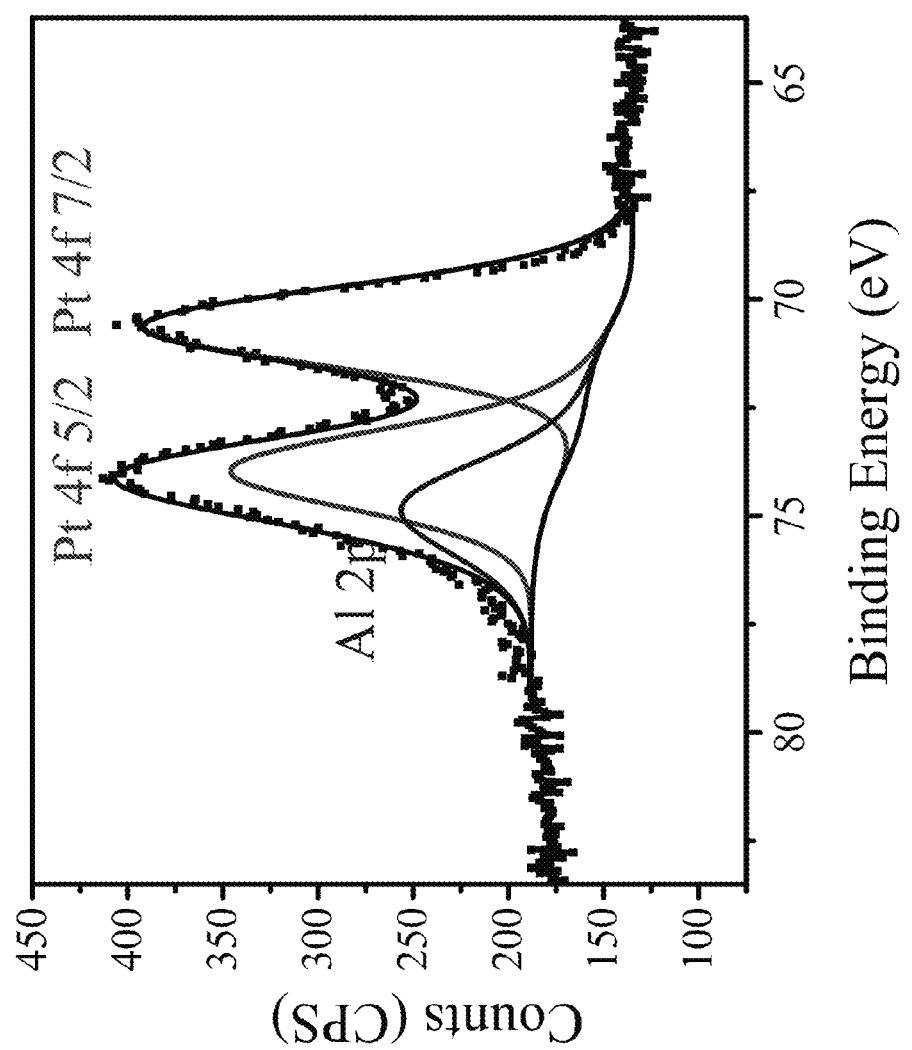
FIG. 3b shows a Pt 4f XPS profile of $H_2$ reduced Pt/MCM-41.
Figure 4A:
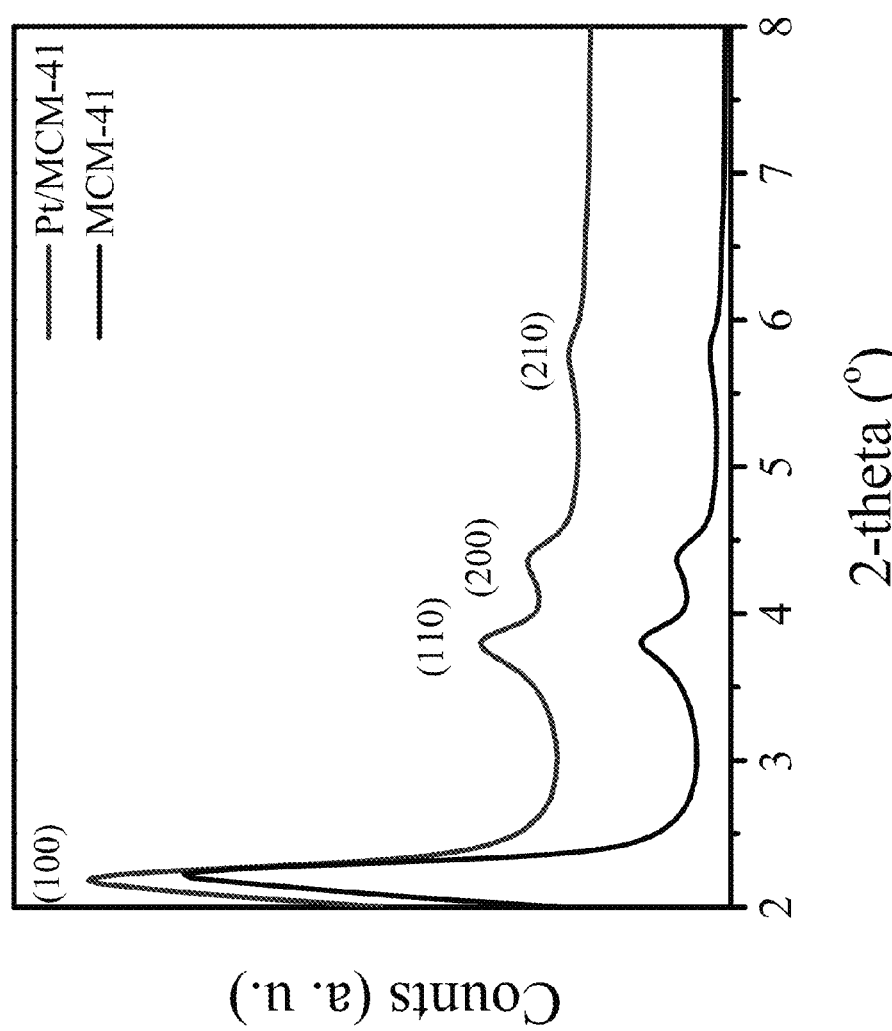
FIG. 4a shows small angle XRD patterns according to the Examples.

Metallic Pt is one of the two components needed for the bi-functionality, the other part being the MCM-41 support supplying acid sites for the alkylation reaction between 2MF and butanal. For such activity, the mesopore structure of the MCM-41 must be retained after introducing Pt for HA of the 2MF and butanal. The TEM image in FIG. 3a shows an ordered pore system with pore size in the range of 2-3 nm, similar to that of the fresh MCM-41, and suggests that the mesopore system of Pt/MCM-41 is retained after depositing Pt on the support. While the TEM images represent the local structure of particular Pt/MCM-41 particles, small angle X-ray diffraction (XRD) gives statistical information for the entire Pt/MCM-41 structure. From the XRD patterns of Pt/MCM-41 (FIG. 4a), four peaks can be identified located at 2.17° (normalized peak intensity 100), 3.80° (16), 4.36° (10), and 5.76° (3), which correspond to the hexagonal mesopore of MCM-41 and are consistent with literature. The peak positions and intensity ratios are similar to those of pure MCM-41 (2.14° (100), 3.75° (16), 4.32° (10), and 5.73° (3)), and indicate that the mesoporous architecture is preserved after Pt deposition and high-temperature calcination.

Figure 4B:
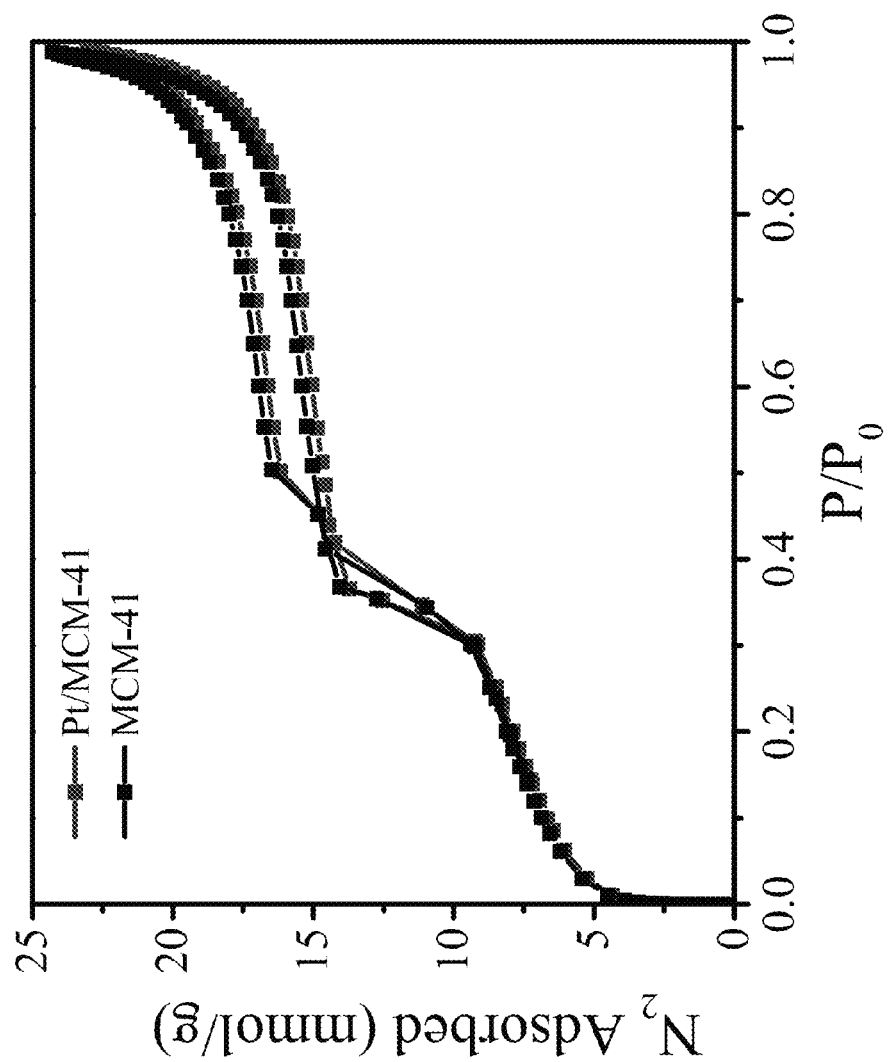
FIG. 4b shows a nitrogen adsorption and desorption isotherms of Pt/MCM-41 and MCM-41 according to the Examples.

Nitrogen adsorption and desorption experiments indicate that the pores remain largely open and accessible. The isotherm curves of both Pt/MCM-41 and MCM-41 exhibit a typical type IV shape, and are similar to each other (FIG. 4b), as the $N_2$ adsorption of two sample at each $P/P_0$ is within 7% difference. Furthermore, the average pore size of the Pt/MCM-41 was calculated to be 3.1±0.3 nm, which is consistent with the TEM images and, within the experimental error, is the same to that of pure MCM-41 (2.6±0.3 nm). After the deposition of Pt on the zeolite, the surface area of the catalyst was determined to be 612±10 $m^2/g$, which is slightly lower than the value of 650±5 $m^2/g$ measured for pure MCM-41. The pore volume decreases from 0.795±0.008 to 0.767±0.017 $cm^3/g$. In both cases, less than a 6% reduction is observed after the deposition of Pt.

TABLE 1

Catalytic performances of bi-functional catalysts for C8+ production from 2-methylfuran.

| Catalysts | Temperature | Conversion[a] | Selectivity to $C_{8+}$[b](Diesel) | $C_{8+}$ Yield |
|---|---|---|---|---|
| 0.1 wt % Pt/MCM-41 | 623 K | 100% | 69% | 69% |
| | 553 K | 100% | 76% | 76% |
| | 503 K | 98% | 98% | 96% |

[a]Conversion is calculated by dividing moles of converted 2MF to original moles of 2MF measured by GC-MS. The error of calculated conversion is ±4%.
[b]The selectivity to C8+ is calculated by the portion of carbon from the 2MF and Butanal converted to C8+ hydrocarbons, and is measured by GC-MS. The error for the calculated selectivity is ±7%.

Figure 5A:
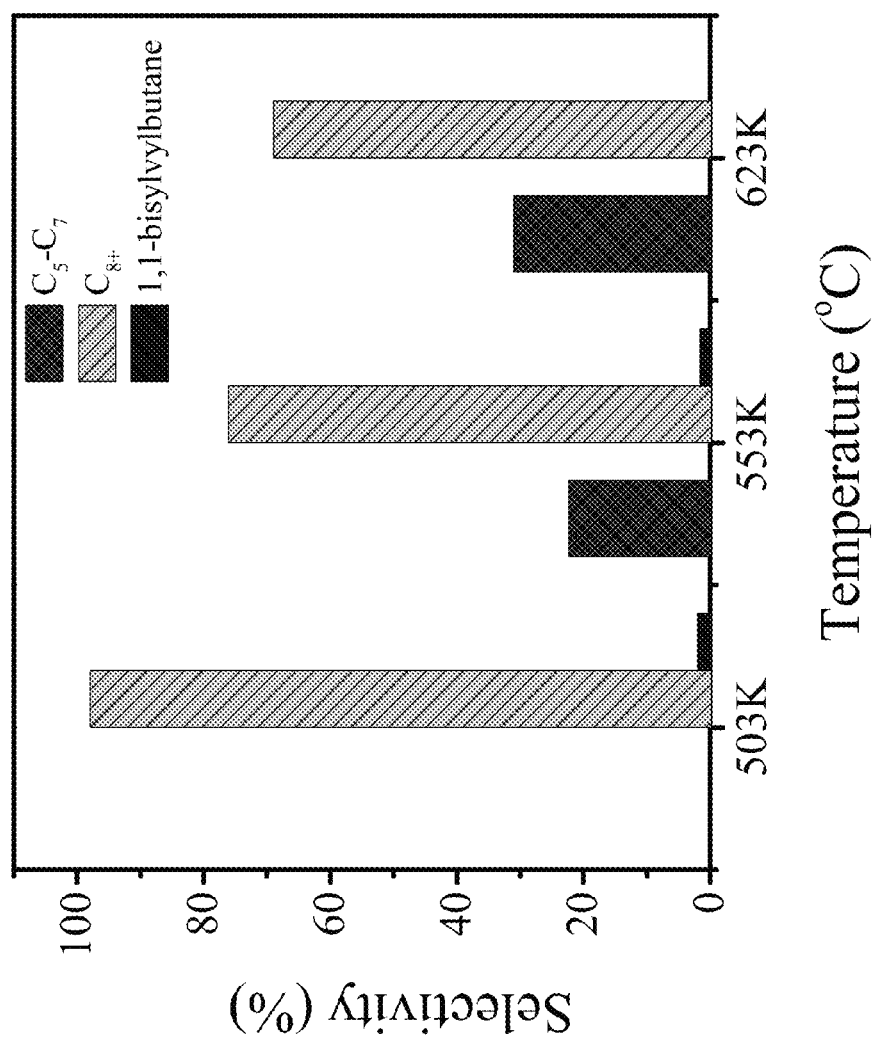
FIG. 5a shows the influence of temperature on the product distribution over Pt/MCM-41.
Figure 5B:
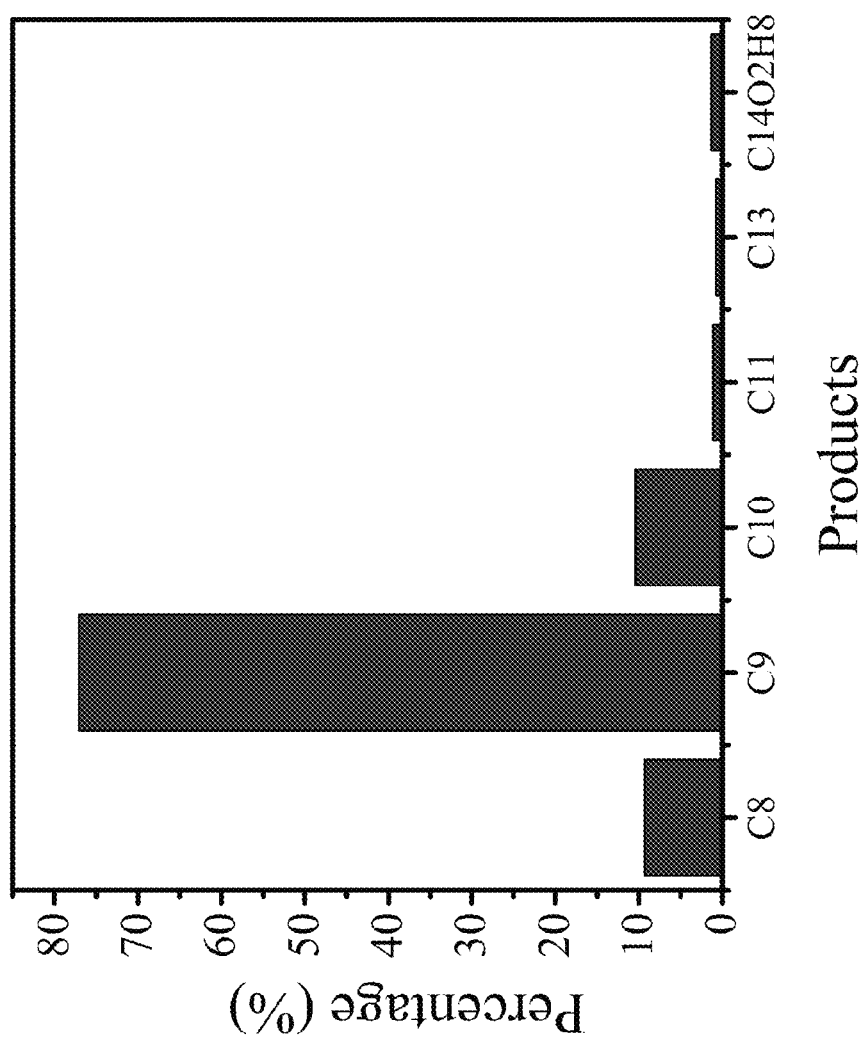
FIG. 5b shows detailed product distribution at 503 K over Pt/MCM-41 (the percentage is calculated based on the percentage of carbon in each product)

The catalytic performance of the bi-functional Pt/MCM-41 catalysts towards $C_{8+}$ production was tested in a fix-bed reactor. 2MF and butanal with a molar ratio of 1:1 (optimal stoichiometric ratio for $C_9$ production) are reacted with hydrogen under 3.5 MPa at various temperatures. As shown in the Table 1 at 623 K, 100% conversion of 2MF is achieved over the Pt/MCM-41 catalysts, with a 69±7% selectivity to $C_{8+}$ hydrocarbons. The yield to $C_{8+}$ (69%) is somewhat lower than that reported previously for the two-step process (87%). The lower yield to $C_{8+}$ in our experiments at 623 K could be attributed to the partial cracking of the produced hydrocarbons on the Pt/MCM-41 catalyst, which leads to the formation of shorter hydrocarbons (mainly $C_7$), see FIG. 4a. Lowering the reaction temperature from 623 to 553 K increases the $C_{8+}$ selectivity from 69% to 76%, while decreasing the selectivity to $C_7$. This result is expected since cracking reactions are favored at higher temperatures. Lowering the reaction temperature to 503 K further increases the $C_{8+}$ selectivity to 98%, as shown in Table 1 and FIG. 5. At 503 K, the overall yield to $C_{8+}$ is 96%, higher than the yield (87%) obtained with the two-step process. These results indicate that the temperature plays an important role in the $C_{8+}$ production by influencing the competition between main and side reactions.

Figure 6A:
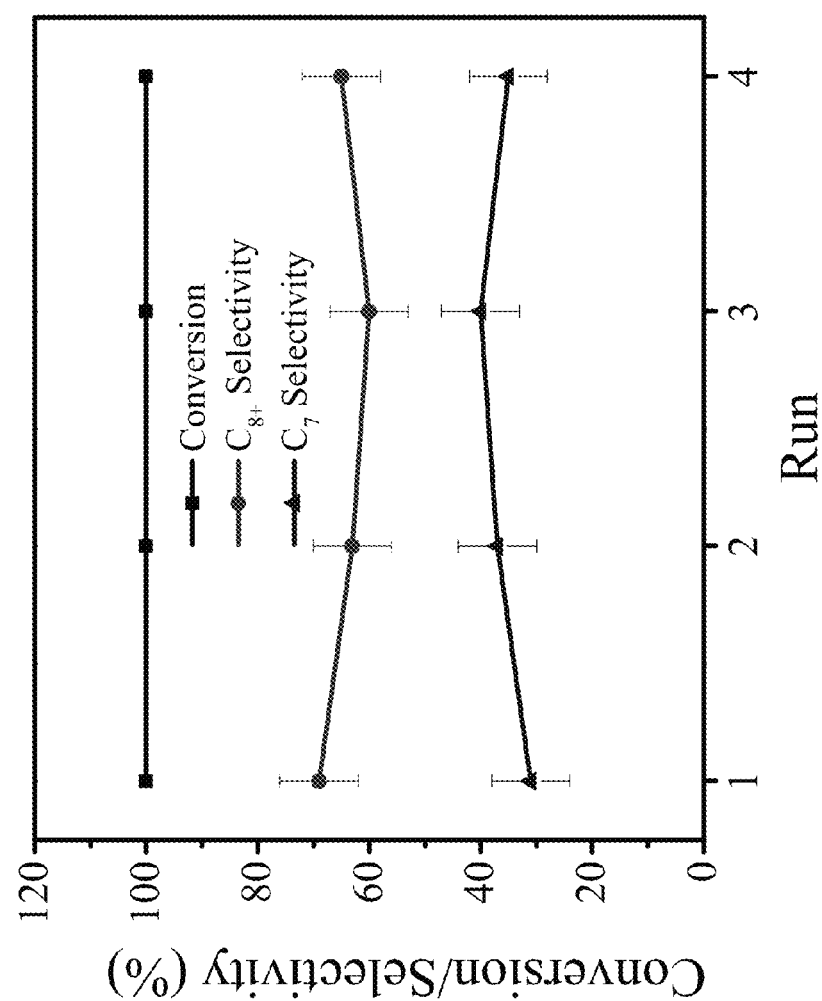
FIG. 6a shows time-on-stream data for the Pt/MCM-41 catalyst for $C_{8+}$ production (each run equals 20 hours) according to the Examples.
Figure 6B:
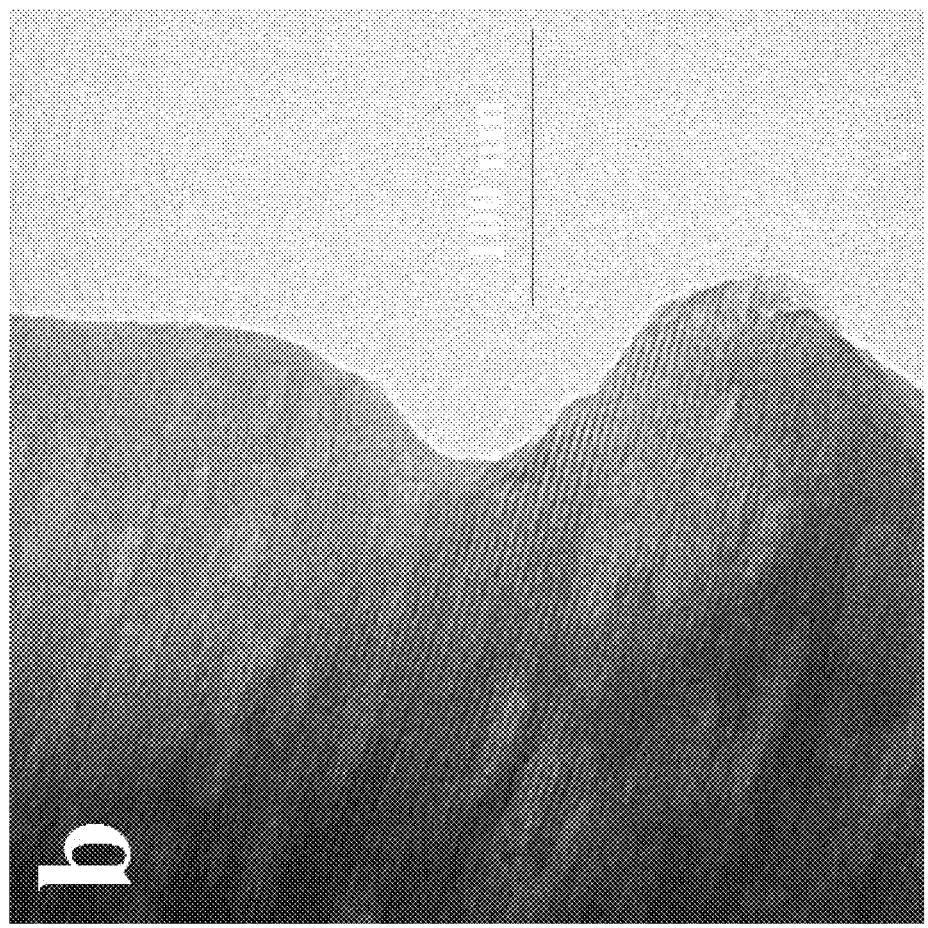
FIG. 6b shows a TEM image of the spent Pt/MCM-41 catalyst after the time-on-stream experiment.
Figure 6C:
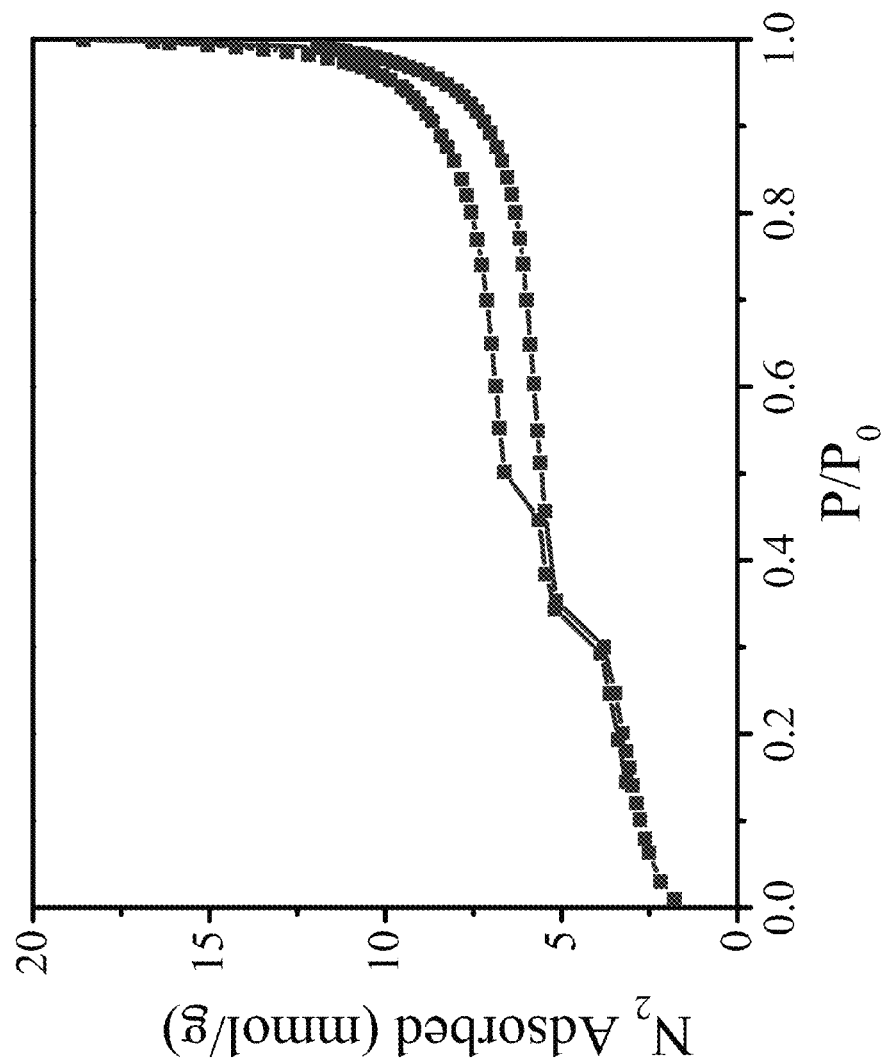
FIG. 6c shows a nitrogen adsorption and desorption isotherm of the after-reaction Pt/MCM-41 catalyst according to the Examples.

To make the bi-functional catalyst viable for $C_{8+}$ production, the catalyst must not only have high yield, as demonstrated, but must also be stable under reaction conditions. Because thermal treatment (>373 K) may destroy the pore system of MCM-41 by either dealumination or coking, the stability of the Pt/MCM-41 catalysts was tested at 623 K, the highest reaction temperature employed in this study, by keeping the same catalyst batch four times on stream for 20 hours with a reactor shut down between the reaction cycles. As shown in FIG. 6a, the conversion of 2MF and the selectivity to $C_{8+}$ are retained at 100% and 69±7%, respectively, which indicates excellent thermal stability of Pt/MCM-41 over multiple reaction cycles. As shown in FIG. 6b, the ordered pore structure of MCM-41 can be clearly identified in the TEM image of the used Pt/MCM-41 catalyst. Furthermore, the nitrogen adsorption and desorption isotherms taken on the used catalyst show the typical type IV isotherm curve, as was observed before see FIG. 6c. This result is consistent with literature reports demonstrating that MCM-41 with high Si:Al ratios can retain part of the mesoporous structure after hydrothermal treatment. Thus, the stability tests, TEM images, and nitrogen isotherm curves indicate that Pt/MCM-41 has a good stability for the $C_{8+}$ production.

Figure 7:
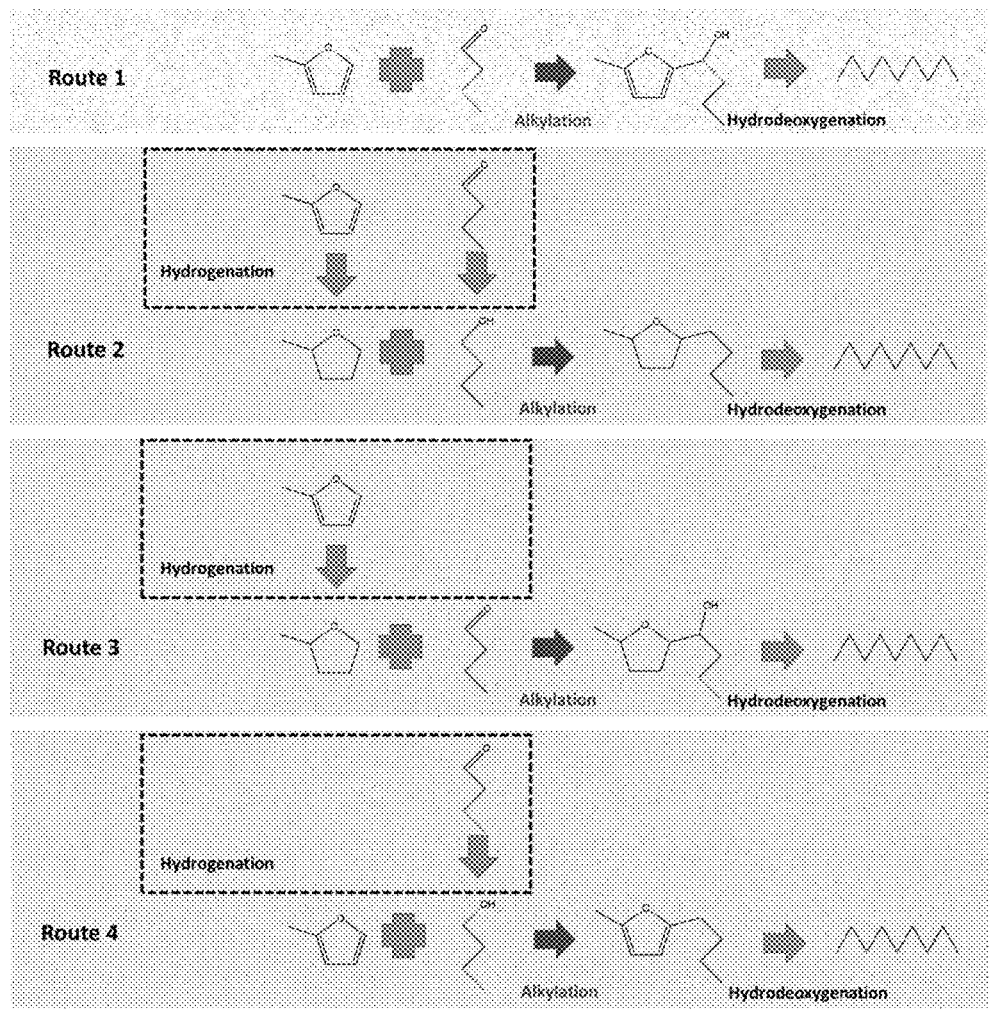
FIG. 7 shows schematic for exemplary reaction pathways for the $C_{8+}$ production on the Pt/MCM-41.

For future catalyst development, it is important to understand how $C_{8+}$ hydrocarbons are produced on the bi-functional catalysts. Four possible reaction pathways are proposed for the $C_{8+}$ production on the bi-functional catalyst. The first feasible route is that 2MF and butanal go through an alkylation reaction at beginning to form 1-bisylvyl-butanol, followed by hydrodeoxygenation reaction to form $C_9H_{20}$ (main $C_{8+}$ hydrocarbon product), as shown in route 1 in FIG. 7. Similar to the first route 1, in routes 2-4, the 2MF and/or butanal may first go through hydrogenation to 2-methyltetrahydrofuran (2MTHF) and/or 1-butanol, followed by the alkylation reaction and hydrodeoxygenation reaction to form $C_9H_{20}$. Due to the extra hydrogenation steps needed for routes 2-4, more active sites for hydrogenation/hydrodeoxygenation are expected. Since noble metals, such as platinum, are usually used for the hydrogenation/hydrodeoxygenation, the requirement for more active sites will likely increase the catalyst cost, even though increasing of catalyst disperse can also increase active site number.

Figure 8:
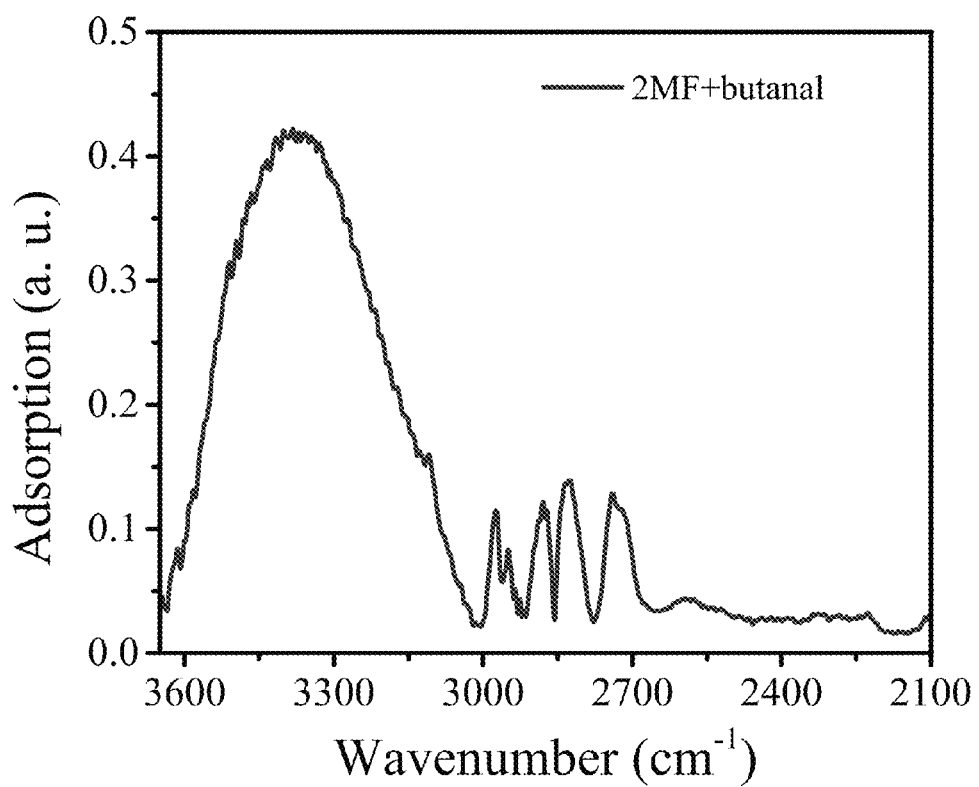
FIG. 8 shows in situ DRIFT spectrum of Pt/MCM-41 under a mixed gas environment containing 2-methylfuran, butanal, and He at 333K.

To test the feasibility of the reaction pathways, in situ DRIFTs has been adopted to follow hydroxyl groups that will be formed during the reaction. A significant difference between the four possible reaction routes is that to form hydroxyl species, hydrogen is required for routes 2-4, while for route 1, the hydroxyl species can be formed through direct the alkylation reaction between 2-MF and butanal without the presence of hydrogen. Thus, we performed in situ DRIFT experiments on the Pt/MCM-41 catalysts with 2-MF and butanal carried by He instead of $H_2$. The spectra were background corrected using a background obtained under pure He and a representative result is shown in FIG. 8. A broad peak corresponding to the O—H stretching vibration is observed in the spectral range between 3600-3000 cm$^{-1}$, along with multiple peaks associated with C—H stretching vibrations between 2650-3000 cm$^{-1}$. The formation of O—H species on the Pt/MCM-41 catalyst indicates that the alkylation between 2-MF and butanal can proceed without the presence of $H_2$ in the reaction feed. This is consistent with our results from the batch reactions for screening of catalyst support. During the batch reactions, alkylation reaction between 2MF and butanal without $H_2$ assistance has been observed, as was shown in FIG. 2. Therefore, the DRIFT spectra indicate that pathway 1 is a possible reaction pathway for $C_{8+}$ production on Pt/MCM-41.

Even though the in situ DRIFT spectra show that the alkylation reaction in route 1 is feasible, the reaction rate of the alkylation may be too slow to compete with routes 2-4. To be the dominate pathway for $C_{8+}$ production, reaction 1 should be the kinetically preferred route, as compared to its competitors (route 2-4 in Scheme 1). To find the most favorable routes, the reaction rates of route 1-4 are compared with a set of batch reactions between 2MF or 2MTHF and butanal or 1-butanol carried out under atmospheric pressure to test whether routes 2-4 are competitive with route 1. The reaction between 2MF and butanal stands for the route 1, the reaction between 2MTHF and 1-butanol for route 2, 2MTHF and butanal for route 3, and 2MF and 1-butanol for route 4. The reaction conditions are kept the same for each of those batch reactions. All four batch reactions simulate one of the most important steps in routes 1-4, that is the chain growth by hydroalkylation reaction. While the reaction between 2MF and butanal gives 62% conversion of 2MF, the other reactions show no conversion of 2MF or 2MTHF. Thus, this comparison indicates then route 1 is not only feasible but also the kinetically favorable pathway for C8+ production on Pt/MCM-41.

To further confirm that route 1 is the dominate pathway for $C_{8+}$ production, two steady-state fixed bed reactions were compared to demonstrate whether the conversion of the 2MF and butanal without hydrogen present is similar to that with hydrogen assistance. The experiment with $H_2$ represents the reaction for $C_{8+}$ production, while the second condition under Ar represents the reaction for the route 1, as shown in scheme 1. If the $C_{8+}$ production follows route 1, both reactions under $H_2$ or Ar should exhibit very similar conversion of 2MF. The two reactions are performed at similar reaction conditions as those that have been used for $C_{8+}$ production. However, the total pressure in the reactor was lowered from 500 psi to 100 psi due to limitation of the pressure reducing valve for Ar. As seen in Table 2, the reaction under Ar shows considerable conversion of 2MF (62%), a value similar to that observed under $H_2$ (69%). This result agrees with the previous bath reaction tests and confirms that route 1 is indeed the dominate reaction pathway for $C_{8+}$ production.

TABLE 2

Influence of gas environment on the conversion of 2-methylfuran on Pt/MCM-41

| Reactions | Conversion [a] |
|---|---|
| 2MF + Butanal + $H_2$ [b] | 69% [c] |
| 2MF + Butanal + Ar | 62% |

[a] Tested under 100 psi, conversion calculated based on the amount of 2MF before and after reaction.
[b] Keep all other reaction conditions the same, including the GHSV, pressure, the activation procedure, the amount of catalyst.
[c] Measured with FID detector on GC-MS.

CONCLUSIONS

A bi-functional Pt/MCM-41 catalyst has demonstrated an overall reaction yield of 96% for the conversion of waste-biomass derived 2MF and butanal to drop-in fuels. The MCM-41 works as support for Pt, and also supplies acid sites for the alkylation reaction between 2-methylfuran and butanal to form long chain carbohydrates, which are then hydrodeoxygenated to hydrocarbons on the Pt. The production of $C_{8+}$ on Pt/MCM-41 is sensitive to the reaction temperature, which influences the selectivity to hydrocarbon fuels and chain length of side-products. Based on in situ IR spectra and steady-state reaction experiments, a reaction pathway is proposed, comprising of the alkylation reaction of 2MF and butanal followed by hydrodeoxygenation.

These and other modifications and variations to the present invention may be practiced by those of ordinary skill in the art, without departing from the spirit and scope of the present invention, which is more particularly set forth in the appended claims. In addition, it should be understood that the aspects of the various embodiments may be interchanged both in whole or in part. Furthermore, those of ordinary skill in the art will appreciate that the foregoing description is by way of example only, and is not intended to limit the invention so further described in the appended claims.

What is claimed:

1. A method for deriving a high-C hydrocarbon fuel from an organic source feedstock, the method comprising:
    contacting a mixture of the organic source feedstock and an aldehyde with a catalytic material to produce a product stream comprising a high-C hydrocarbon fuel, wherein the catalytic material comprises a metal and a zeolite, wherein the catalytic material comprises the metal in a weight percent of about 0.01% to about 10% of the total weight of the catalytic material; and
    separating the high-C hydrocarbon fuel in the product stream from any remaining organic source feedstock or aldehyde.

2. The method as in claim 1, wherein the organic source feedstock comprises $C_5$ to $C_6$ molecules.

3. The method as in claim 1, wherein the organic source feedstock comprises at least about 50% by weight of $C_5$ to $C_6$ molecules.

4. The method as in claim 1, wherein the organic source feedstock comprises at least about 75% by weight of $C_5$ to $C_6$ molecules.

5. The method as in claim 1, wherein the organic source feed stock comprises a furfural, a furfural derivatives, levulinic acid, derivatives of levulinic acid or mixtures thereof.

6. The method as in claim 1, wherein the organic source feed stock comprises 2-furaldehyde, 5-hydroxymethylfurfural, furfuryl alcohol, methylfuran, tetrahydrofurfuryl alcohol, hydroxylmethylfurfural, 2-methlyhydrofuran, 2-methyltetrahydrofuran, tetrahydrofuran-5-dimethanol, furoic acid, 1,5-pentanediol, 1,2-pentanediol, 1,4-pentanediol, or mixtures thereof.

7. The method as in claim 1, wherein the aldehyde comprises an aldehyde functional group attached to an organic group.

8. The method as in claim 7, wherein the organic group comprises an alkyl chain, an alkyne chain, or an aromatic group.

9. The method as in claim 1, wherein the aldehyde comprises formaldehyde, acetaldehyde, propionaldehyde, butraldehyde, a derivative of butanal, benzaldehyde, a benzaldehyde derivative, cinnamaldehyde, tolualdehyde, furfural, retinaldehyde, a carbohydrate, or derivatives thereof.

10. The method as in claim 1, wherein the aldehyde comprises 2-methylbutanal.

11. The method as in claim 1, wherein the metal of the catalytic material is deposited on a solid acid support.

12. The method as in claim 11, wherein the solid acid support comprises a mesostructured silicate.

13. The method as in claim 11, wherein the solid acid support comprises a mesostructured aluminosilicate.

14. The method as in claim 1, wherein the metal of the catalytic material comprises Ce, Cu, Eu, Fe, Ga, Gd, In, Ir, La, Nd, Ni, Pd, Pr, Pt, Rh, Ru, Sm, Zn, Zr, or mixtures thereof.

15. The method as in claim 1, wherein the metal of the catalytic material comprises Cu, Ni, Pd, Pt, or mixtures thereof.

16. The method as in claim 1, wherein the catalytic material comprises the metal in a weight percent of about 0.05% to about 5% of the total weight of the catalytic material.

17. The method as in claim 1, wherein the catalytic material comprises the metal in a weight percent of about 0.1% to about 2.5% of the total weight of the catalytic material.

18. The method as in claim 1, wherein the mixture of the organic source feedstock and the aldehyde is contacted with the catalytic material as a gas.

19. The method as in claim 1, wherein the mixture of the organic source feedstock and the aldehyde is contacted with the catalytic material at a reaction temperature of about 190° C. to about 350° C.

20. The method as in claim 1, further comprising:
    prior to contacting the mixture of the organic source feedstock and the aldehyde with the catalytic material, heating the mixture of the organic source feedstock and the aldehyde to a gaseous state.

21. The method as in claim 20, wherein the mixture of the organic source feedstock and the aldehyde is heated to a reaction temperature of about 190° C. to about 350° C.

22. The method as in claim 1, wherein separating the high-C hydrocarbon fuel in the product stream from any remaining organic source feedstock or aldehyde comprises: passing the product stream through a condenser to liquefy the high-C hydrocarbon fuel.

23. The method as in claim 22, wherein the condenser has a condensing temperature of about −10° C. to about 20° C.

24. The method as in claim 1, wherein the mixture of the organic source feedstock and the aldehyde is contacted with the catalytic material within a reactor.

25. The method as in claim 24, wherein the mixture of the organic source feedstock and the aldehyde is introduced into the reactor as a continuous inflow stream.

26. The method as in claim 24, wherein the aldehyde is introduced into the reactor as a continuous inflow stream.

27. The method as in claim 24, wherein a continuous outflow of the product stream exits the reactor.

* * * * *